(12) United States Patent
Bradley

(10) Patent No.: US 8,345,640 B2
(45) Date of Patent: Jan. 1, 2013

(54) METHOD AND DEVICE TO USE A MOBILE TERMINAL WITH A NEW SUBSCRIPTION

(75) Inventor: Paul Bradley, Fareham Hampshire (GB)

(73) Assignee: Gemalto SA, Meudon (FR)

( * ) Notice: Subject to any disclaimer, the term of this patent is extended or adjusted under 35 U.S.C. 154(b) by 583 days.

(21) Appl. No.: 12/520,622

(22) PCT Filed: Dec. 21, 2007

(86) PCT No.: PCT/IB2007/004086
§ 371 (c)(1),
(2), (4) Date: Jun. 22, 2009

(87) PCT Pub. No.: WO2008/078175
PCT Pub. Date: Jul. 3, 2008

(65) Prior Publication Data
US 2010/0015949 A1    Jan. 21, 2010

(30) Foreign Application Priority Data

Dec. 22, 2006    (EP) ..................... 06270109

(51) Int. Cl.
*H04B 7/216* (2006.01)
(52) U.S. Cl. ..................... 370/335; 455/432.1
(58) Field of Classification Search ............... 370/335; 455/432.1
See application file for complete search history.

(56) References Cited

U.S. PATENT DOCUMENTS

| 2001/0030235 | A1 | 10/2001 | Hedemann et al. |
| 2004/0087305 | A1* | 5/2004 | Jiang et al. .................. 455/432.1 |
| 2005/0070278 | A1* | 3/2005 | Jiang .......................... 455/432.3 |
| 2008/0113687 | A1* | 5/2008 | Prendergast et al. ......... 455/558 |
| 2008/0242267 | A1* | 10/2008 | Soni et al. ..................... 455/411 |

FOREIGN PATENT DOCUMENTS

| EP | 1 239 687 A1 | 9/2002 |
| FR | 2 856 878 A1 | 12/2004 |
| WO | 98/10614 A1 | 3/1998 |
| WO | 02/21872 A1 | 3/2002 |
| WO | 2004/060005 A1 | 7/2004 |

OTHER PUBLICATIONS

International Search Report issued in PCT/IB2007/004086, mailed on Jun. 2, 2008, 4 pages.

* cited by examiner

*Primary Examiner* — Sai-Ming Chan
(74) *Attorney, Agent, or Firm* — Osha Liang LLP

(57) ABSTRACT

The invention relates to a method and device to use a locked mobile terminal with a new subscription. This method is based on presentation of several IMSI and detection of an IMSI with valid MCC and/or MNC code replaced by another IMSI so that the end-user can use his new SIM card with the locked mobile terminal.

7 Claims, 2 Drawing Sheets

METHOD AND DEVICE TO USE A MOBILE TERMINAL WITH A NEW SUBSCRIPTION

BACKGROUND

1. Field of the Invention

The invention relates to a method and a device to freely use a mobile terminal, also called handset, when subscribing a new contract with a different operator from the one the mobile terminal is locked with. Such a different operator is for example a Mobile Virtual Network Operator (MVNO), allowing at least voice and data exchanges on a telecommunication network. More particularly, the invention relates to a method and a device for allowing the free usage of mobile terminals.

2. Background Art

Currently, mobile terminals are sold with an operator lock, implemented whereby the mobile operator has subsidized the mobile terminal. The telecommunication operators implement a lock mechanism so that only a subscriber identity module containing the IMSI of that operator can be used. It's known as described in the ETSI standard, that the locked mobile terminal checks for a specific Mobile Country Code (MCC)/Mobile Network Code (MNC) within the International Mobile Subscriber Identity (IMSI) during its initialization phase and unless the IMSI matches the predefined IMSI in the mobile terminal, the subscriber identity module is rejected and considered as not valid by the telecommunication network.

Currently, as disclosed in US2001030235, a procedure for checking the validity of smart cards in a mobile-radio end device is known, comprising the steps of reading, by a mobile-radio end device, a portion of data stored in an International Mobile Subscriber Identity of a smart card in the mobile-radio end device; Comparing the at least a portion of data with allowed value range stored in the mobile-radio end device; and allowing operation of the mobile-radio end device with the smart card by the mobile-radio end device when the portion of data read from the smart card in said step (a) is within the allowed value range stored in the mobile-radio end device.

MVNO today sell many (U)SIM-only packs to end-users. That means that the MVNO provide to end-users an UICC implementing subscriber identity module (SIM) or universal subscriber identity module USIM. When end-users insert their MVNO (U)SIM card into their existing handset, they are often disappointed to find that the handset remains locked to their network facilities unless the end-user pays an unlocking fee or the remainder of the monthly fees until the end of the contract.

The end-user can pay to have their handset unlocked on the black market but this is not always possible and is an extra expense incurred by the end-user.

Currently Different Handset locking mechanisms are implemented and mobile telecommunication operators agree upon several different parameters stored on the subscriber identity module, which must be verified by the handset during the initialization sequence.

These subscriber identity module settings are usually the following fields: Leading MCC/MNC digits of the IMSI field, or GID1/GID2 values. The more important of these two fields is the MCC/MNC digits but both can possibly play an important role for the subscriber identity module initialization check.

A small proportion of Mobile network operators today are implementing SIM lock via GID1/GID2 and the principal means of mobile terminal locking is via the IMSI. Consequently, when a mobile virtual network operators (MVNO) provides a subscriber identity module to a new end-user, unless the end-user has an unlocked mobile terminal, he cannot use the mobile virtual network operators (MVNO) subscriber identity module.

Consequently, when a mobile virtual network operators (MVNO) provides a subscriber identity module to a new end-user, unless the end-user has an unlocked mobile terminal, he cannot use the mobile virtual network operators (MVNO) subscriber identity module.

There is consequently a need to provide a way for the end-user to use his mobile terminal when subscribing for a mobile virtual network operators (MVNO) subscription or prepaid contract.

It is in fact desirable to provide an efficient way to allow the mobile phone end-user to benefit from this new MVNO subscription, even if the mobile terminal he has was previously, during the phase the end-user had a contract with another network operator, locked by the said network operator. There are indeed locked mobile terminals MVNO new customers would like to use.

SUMMARY

The invention relates to a method and device to use a locked mobile terminal with a new subscription. This method is based on presentation of several IMSI and detection of an IMSI with valid MCC and/or MNC code replaced by another IMSI so that the end-user can use his new SIM card with the locked mobile terminal.

Other aspects and advantages of the invention will be apparent from the following description and the appended claims.

DETAILED DESCRIPTION

Hereafter, an embodiment of the invention will be described wherein the end-user is placing calls using a mobile terminal associated to a subscriber identity module, connected via a mobile radio communication network such as GSM or 3G telecommunication network.

A dedicated SIM application is stored in a memory of the said subscriber identity module, which could be implemented as a personal token like an UICC card as defined in ETSI standards. This dedicated application can be transferred or installed into the mobile terminal memory in another embodiment. Associated data such as the IMSI file can as well be stored into the subscriber identity module's memory or, in another embodiment, into the mobile terminal's memory.

There are several ways by which the said dedicated SIM application can allow the end-user to use his mobile terminal with a MNVO subscription.

According to one aspect of the invention, there is provided a method that is implemented on the said system.

Figure 1:
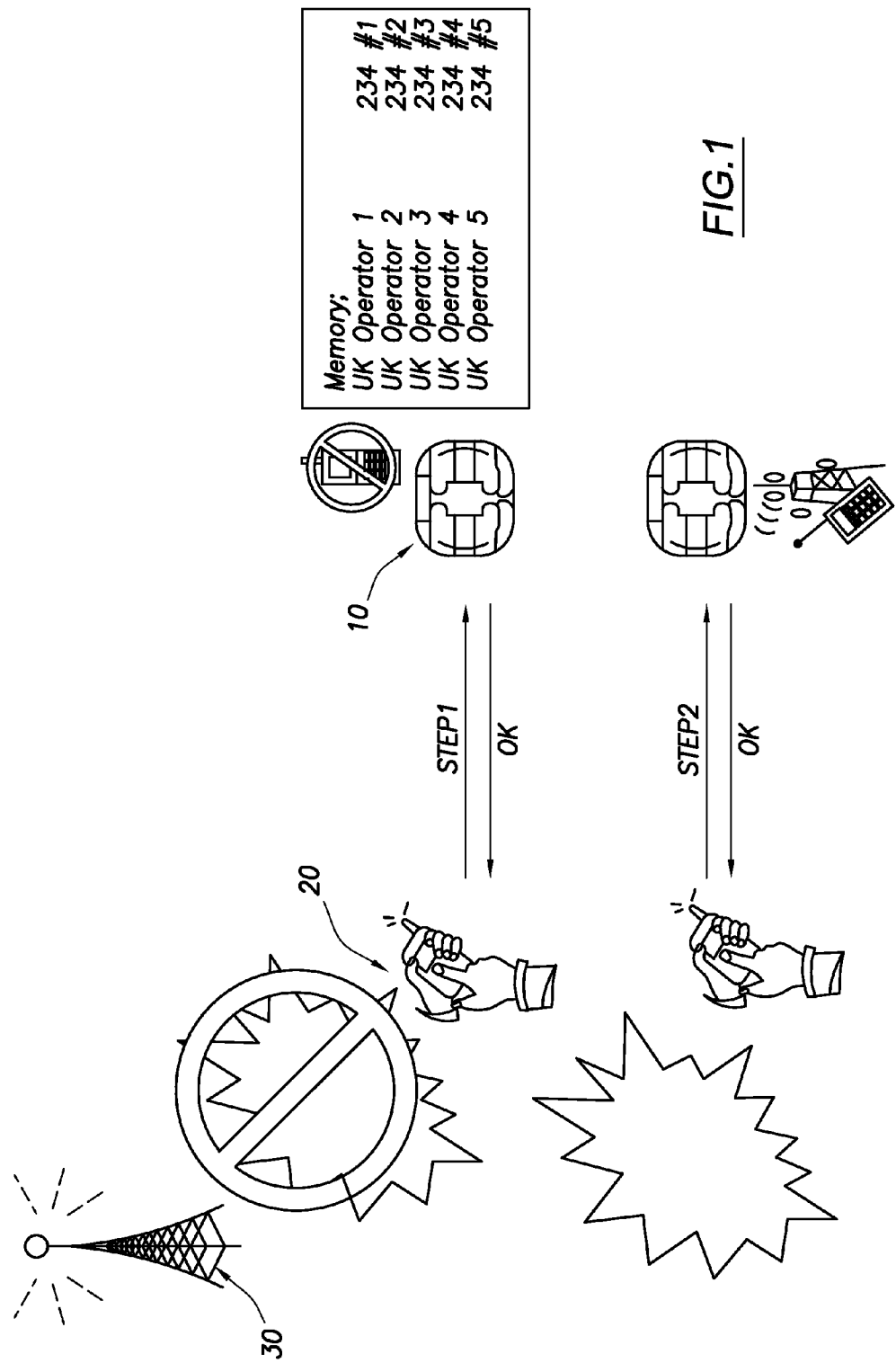
FIG. 1 represents the main steps related to a system implemented in order to achieve an embodiment of the invention.
Figure 2:
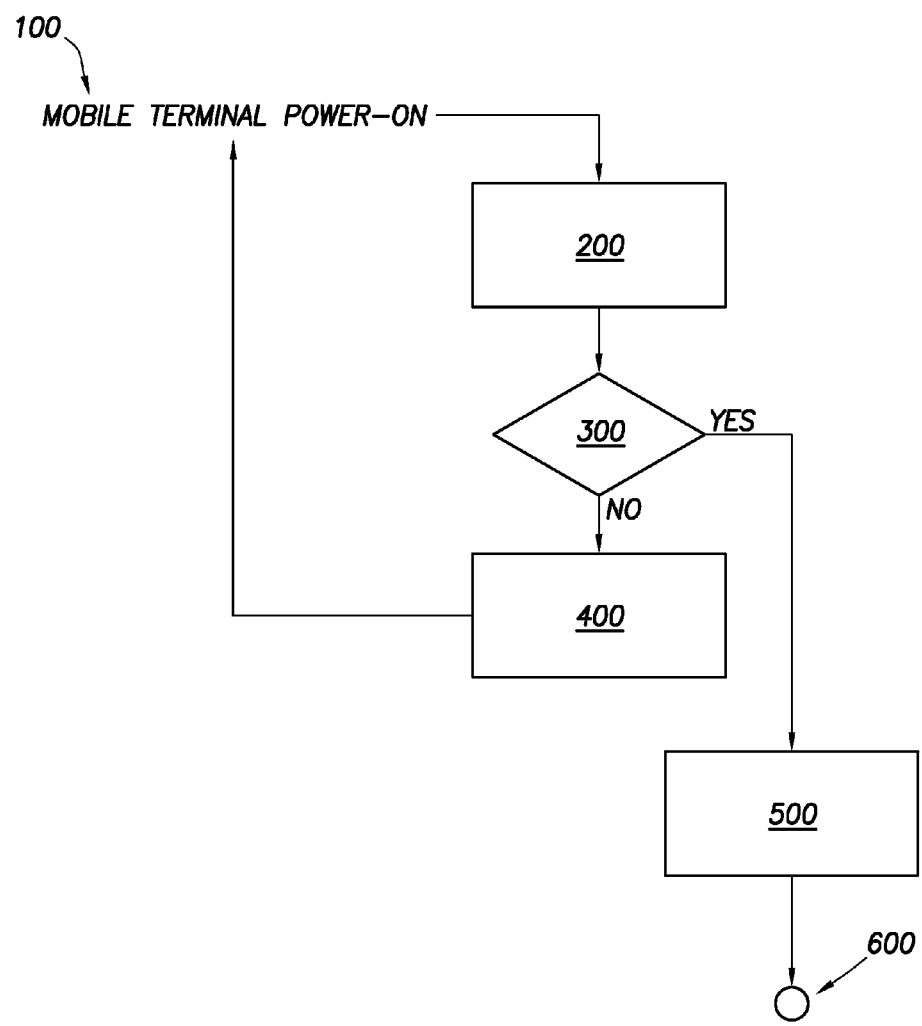
FIG. 2 is a flowchart showing a sequence of steps, according to one method in the system in FIG. 1 for allowing the usage of the locked mobile terminal in order for the end-user to use his previously locked mobile terminal with his new subscription. This new subscription could be as an example a MVNO one.

In order to allow SIM lock, as described in the ETSI standard, the subscriber identity module stores in one of its memories a per-country list of the operators MCC/MNC codes as described into step 1 of FIG. 1. For example in the United Kingdom, the subscriber identity module would currently store the following codes, which codes are well known as recited in current standards:

| | |
|---|---|
| UK Operator 1 | 234 #1 |
| UK Operator 2 | 234 #2 |
| UK Operator 3 | 234 #3 |
| UK Operator 4 | 234 #4 |
| UK Operator 5 | 234 #5 |

At each power-on of the mobile terminal 100, the subscriber identity module provides to the mobile terminal the standardized value of the IMSI (International Mobile Subscriber Identity) containing the MCC/MNC from the list integrated 200.

The IMSI is a globally-unique code number that identifies a GSM subscriber to the network. The IMSI is linked to the end-user account information with the carrier. The IMSI resides in the subscriber identity module, which can be moved from one GSM phone to another.

Once the mobile terminal is successfully powered-on with an IMSI code that successfully passes the SIM-lock check 300, the dedicated SIM (subscriber identity module) application registers itself to an event at the end of the mobile terminal subscriber identity module initialization procedure.

The correct/real IMSI value of the MVNO is then inserted by the dedicated SIM application into the IMSI standardized file and a request is made so that the mobile re-reads the value of the IMSI file and re-attempts network registration 500. This correct/real IMSI value of the MVNO typically does not include a MCC/MNC code which is accepted by the mobile terminal.

In one preferred embodiment the dedicated SIM application remembers which IMSI value from the list was successful and at the next mobile terminal power-on, it presents that IMSI during the initialization procedure. Again, after the SIM-lock check, the dedicated SIM application repeats step 200 and inserts the correct IMSI and re-requests the mobile terminal to re-attempt network authentication procedure.

A detailed implementation can be based on the following embodiment: The mobile network 30, owned by an MVNO, sell subscriber identity module card prepaid packs in all of their mobile phone shops. When a user enters the shop, they ask for a subscriber identity module pack. When the user inserts the subscriber identity module 10 into their mobile terminal 20, the mobile terminal displays "SIM locked" because their mobile terminal is locked to the mobile network operator 30.

Implementing a dedicated SIM application installed into the subscriber identity module 10, the following steps will follow:

The User inserts the new subscriber identity module 10 with the said dedicated SIM application available on it as shown on step 1.

The said dedicated SIM application presents the first "dummy" IMSI with operator 1 MCC/MNC code as disclosed in step 200.

The mobile terminal remains locked and displays "invalid SIM card" 300.

The user powers off the mobile terminal 400.

The user powers on the mobile terminal 100, so that the said dedicated SIM application presents the second "dummy" IMSI with operator 2 MCC/MNC code 200.

The mobile terminal remains locked and displays "invalid SIM card" 300.

The user powers off the mobile terminal 400.

The user powers on the mobile terminal 100 so that the said dedicated SIM application presents the third "dummy" IMSI with operator 3 MCC/MNC code 200.

The mobile terminal is unlocked and displays the network search screen but cannot gain access to the network as a false IMSI was presented 500.

The said dedicated SIM application then automatically replaces the IMSI with the real 30 MVNO IMSI and requests the mobile terminal to re-read the IMSI value and retry network registration procedure 500.

In one preferred embodiment, in order to save time and to optimize the end-user experience, he said dedicated SIM application memorizes that it was successful with the operator 3 MCC/MNC code and that it should use this code first next time 500.

The user is successfully authenticated on the network 30 using the correct IMSI step 2.

The user can place calls, send SMS and/or use data services, depending of the MVNO subscription he paid for.

In the preferred embodiment, at next power-on, the operator 3 MCC/MNC code is presented first. The mobile terminal SIM-lock is overcome and then the SIM application automatically replaces the operator 3 IMSI with that of the MVNO IMSI at the end of the initialization procedure. The SIM dedicated application requests that the mobile terminal re-attempts network registration.

In the case where operators use a Group Identifier (GID) lock then this value can be stored by the table and switched in the same manner as the IMSI.

From an end-user experience point of view, as an example, when the end-user goes online to buy a SIM pack he then receives a subscriber identity module. When the end-user inserts this subscriber identity module into his mobile phone, step 1, the mobile phone, following the ETSI standard, displays "SIM card invalid" because it is locked to another telecommunication mobile network.

If the dedicated SIM application described above is available on the MVNO subscriber identity module, the following will then happen:

The end-user associates the new MVNO subscriber identity module with the mobile terminal.

The dedicated SIM application described above in the new MVNO subscriber identity module presents the first "dummy" IMSI with operator 1 MCC/MNC code.

The handset remains locked and displays "invalid SIM card". The end-user powers off the mobile terminal and then power it on.

This can happen several times, depending of the number of IMSI stored.

The dedicated SIM application described above in the SIM presents the N−1 "dummy" IMSI with associated MCC/MNC codes.

The handset remains locked and displays "invalid SIM card". The end-user powers off the mobile terminal and then powers it on.

The dedicated SIM application presents the last "dummy" IMSI with correct MCC/MNC code.

The mobile terminal is unlocked as the dedicated SIM application has successfully by-passed the IMSI check and therefore the handset displays the network search screen but cannot gain access to the network as a false IMSI was presented.

The dedicated SIM application automatically replaces the IMSI with the real MVNO IMSI (incorporating the real MCC/MNC) and requests the mobile terminal to re-read the IMSI value and retry network registration procedure. The dedicated SIM application memorizes that it was successful with the last MCC/MNC code and that it should use this code first next time.

The user is successfully authenticated on the network 30 or the equivalent national roaming partner network using the correct IMSI.

The user can then use his new MVNO subscription and set up calls, send SMS or use data services.

At next power-on, the stored MCC/MNC is presented first. The mobile terminal SIM-lock is overcome straight away and then the dedicated SIM application automatically replaces the stored IMSI with that of the MVNO IMSI at the end of the initialization procedure. The dedicated SIM application requests that the mobile terminal re-attempts network registration now that the MCC/MNC check has been by-passed.

Another step can be added, allowing the SIM application to remember which dummy IMSI value from the list was successful and at the next power-on, it presents that IMSI during the initialization procedure.

The SIM can tell the network authentication is expected to be successful thanks to the updating of the location information file with data indicating, as a function of the considered area, when the authentication has already been successful or not and which adapted dummy IMSI code to be used at first attempt in which area. Again, after the SIM-lock check, the SIM application repeats the step above and inserts the correct IMSI and re-requests the mobile terminal to re-attempt network authentication procedure.

Those skilled in the art should recognize that the method described above is also applicable to other types of communication sessions between two devices operable either on the same network or different networks.

The dedicated SIM application (not shown) is preferably stored on the subscriber identity module, more specifically in the subscriber identity module memory.

According to one embodiment, this subscriber identity module can also be a piece of software, the dedicated said application being in this case also a piece of software.

According to one other embodiment, the dedicated SIM toolkit application is stored in the subscriber identity module memory for implementing the method that is displayed using the MMI (Man Machine Interface) of the mobile station. Such an application is also known as an applet, or more specifically a cardlet, when implemented on a Java™ card type of subscriber identity module.

Hereafter, this application will be referred to as an agent application. The subscriber identity module processor executes this agent application. Advantageously, in a preferred embodiment, everything happens into the subscriber identity module.

Although the invention is described with SIM toolkit application, it is not to be construed to be limited as such. For example, although not ideal, the said dedicated SIM application can be developed so that to be executable on the mobile terminal and sent to the mobile terminal memory.

As another example, although the mobile terminal and subscriber identity module are shown and described to be linked devices, it should not be construed to be limited as such. They can be as example two separate devices communicating using contactless channels such as infrared IrDA or ISO 14443.

Another advantage of the present embodiment of the invention is to propose to the end-user a free solution to use mobile he already paid for without needing to pay additional fees.

In one embodiment, relating to the case where operators use a Group Identifier (GID) lock, this dedicated value can be stored by the table and switched in the same manner as the IMSI.

The invention claimed is:

1. A method to use a mobile terminal with a different operator from the one the mobile terminal was previously used with, on a telecommunication network comprising the said mobile terminal and a personal token, said method comprising:
   a step of personal token actuation in the mobile terminal; and
   a step of presentation of a dummy International Mobile Subscriber Identity ("IMSI") code from the said personal token to the said mobile terminal, and wherein when there is detection by the mobile terminal of the presentation of the dummy IMSI code with a first code selected from a group consisting of a first Mobile Country Code ("MCC") and a first Mobile Network Code ("MNC") code, the step of presentation further comprises:
      a step of indicating that the personal token is invalid in response to the step of presenting the dummy IMSI and the first code;
      a step of selecting a second code from a group consisting of a second MCC and a second MNC;
      a step of presenting the dummy IMSI and the second code to the mobile terminal;
      a step of displaying a network search screen on a screen of the mobile terminal in response to the presentation of the dummy IMSI and the second code;
      a step of replacing the dummy IMSI code with an IMSI code of a different operator after the step of displaying, and
      a step of requesting the mobile terminal to re-read the IMSI code and retry network registration procedure after the step of replacing.

2. The method according to claim 1, wherein the step of replacing the dummy IMSI code with the IMSI code of the different operator is followed by a step of memorizing that the IMSI code of the different operator was successful with the last IMSI code and that the IMSI code of the different operator should use this code as the first presented IMSI code at the next personal token actuation.

3. The method according to claim 1 wherein the step of requesting is preceded by a step of repetition of the presentation of other IMSI codes stored into the personal token.

4. The method according to claim 1, wherein the step of indicating comprises displaying 'invalid SIM' on the screen of the mobile terminal.

5. A terminal system comprising:
   a mobile terminal; and
   a personal token which the terminal system is configured to store and run instructions for allowing the terminal system to use the said mobile terminal with a different operator from the one the mobile terminal was previously used with on a telecommunication network,
   wherein said instructions, when executed, induce the terminal system to, when there is detection of a presentation of a dummy IMSI code and a first code selected from a group consisting of first MCC and a first MNC code:
  indicate that the personal token is invalid in response to the step of presenting the dummy IMSI and the first code;
  select a second code from a group consisting of a second MCC and a second MNC;
  present the dummy IMSI and the second code to the mobile terminal;
  display a network search screen on a screen of the mobile terminal in response to the presentation of the dummy IMSI and the second code;
  replace the dummy IMSI code with an IMSI code of a different operator after the displaying,
  request the mobile terminal to re-read the IMSI code and retry network registration procedure after the replacing.

6. The terminal system according to claim 5, wherein a dedicated application is stored in the personal token, wherein when said application is run by the personal token, the application performs:
  presentation of the dummy IMSI code to the said mobile terminal,
  in case of detection of the presentation of the dummy IMSI code and the second code:
    replacing the dummy IMSI code with the IMSI code of the different operator, and
    requesting the mobile terminal to re-read the IMSI code and retry network registration procedure after the replacing.

7. A personal token for being associated to a terminal inside a communication network, wherein the personal token is configured to:
  store and execute instructions which, when executed, induce the personal token into presenting dummy IMSI code to the said mobile terminal, wherein when there is detection of the presentation of the dummy IMSI and a first code selected from a first MCC and an expected first MNC code:
  indicate that the personal token is invalid in response to the step of presenting the dummy IMSI and the first code;
  select a second code from a group consisting of a second MCC and a second MNC;
  present the dummy IMSI and the second code to the mobile terminal;
  display a network search screen on a screen of the mobile terminal in response to the presentation of the dummy IMSI and the second code;
  replace the dummy IMSI code with the IMSI code of the different operator, and
  replace the mobile terminal to re-read the IMSI code and retry network registration procedure after the replacing.

* * * * *